May 5, 1936.　　　　A. R. BAILEY　　　　2,039,511

LUBRICATOR

Filed March 10, 1934　　2 Sheets-Sheet 1

INVENTOR
A. R. BAILEY
By Hazard and Miller
ATTORNEYS

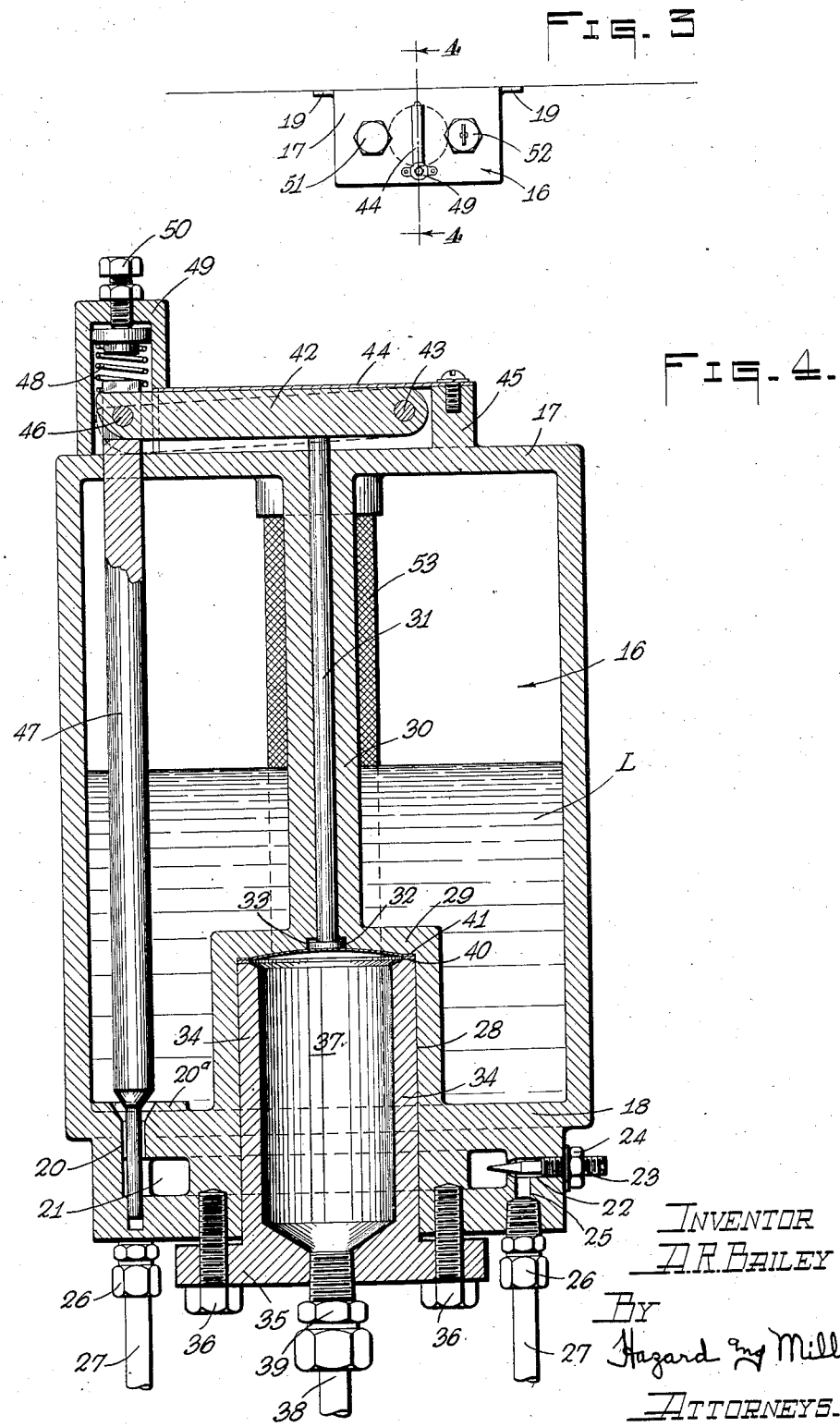

Patented May 5, 1936

2,039,511

UNITED STATES PATENT OFFICE 2,039,511

LUBRICATOR

Albert R. Bailey, San Bernardino, Calif.

Application March 10, 1934, Serial No. 714,985

6 Claims. (Cl. 184—76)

This invention relates to improvements in lubricators and may be considered an improvement over the locomotive lubricator disclosed in my prior Patent No. 1,886,622, issued November 8, 1932.

An object of the present invention is to provide a lubricator which has been primarily designed to be used upon steam locomotives, but which may be used for other purposes, which serves to supply a lubricant to various working parts of the locomotive when the locomotive is running or pulling and which will automatically be shut off to discontinue the supply of lubricant and its consequent waste when the locomotive is stopped.

Certain parts of the steam locomotive require frequent lubrication and there are certain parts which are not readily accessible which require lubrication. These parts largely heretofore have been hand lubricated by the engineer at stopping points and the inaccessible parts have lubricant supplied to them when the locomotive is over a pit at the end of its run. There have also been provided relatively expensive mechanisms designed for supplying lubricant to various parts. The improved lubricator serves to supply lubricant to all of the various points that require lubrication only when the locomotive is running and the arrangement is such that on opening the throttle valve of the locomotive to deliver steam to the steam or working cylinders the lubricator will automatically supply lubricant to the various parts. When the throttle valve is completely closed, as in the instance of the locomotive standing at a stopping point, the lubricator is simultaneously shut off so that lubricant will no longer be supplied and wasted.

In lubricators of the present type it is of importance to keep the lubricant heated, particularly in cold weather, so that it will readily flow through the various tubes to the bearings or points of lubrication even in very cold weather.

Inasmuch as the present lubricator is operated by steam and steam is utilized to heat the lubricant the steam will condense and provision must be made for holding the condensate. A further object of the invention, therefore, is to provide a lubricator of such design as to easily and conveniently dispose of the condensed steam.

With the foregoing and other objects in view, which will be made manifest in the following detailed description and specifically pointed out in the appended claims, reference is had to the accompanying drawings for an illustrative embodiment of the invention, wherein:

Fig. 3 is a top plan view of the improved lubricator.

Fig. 4 is a vertical section taken substantially on the line 4—4 of Fig. 3 but on an enlarged scale.

Figure 1:
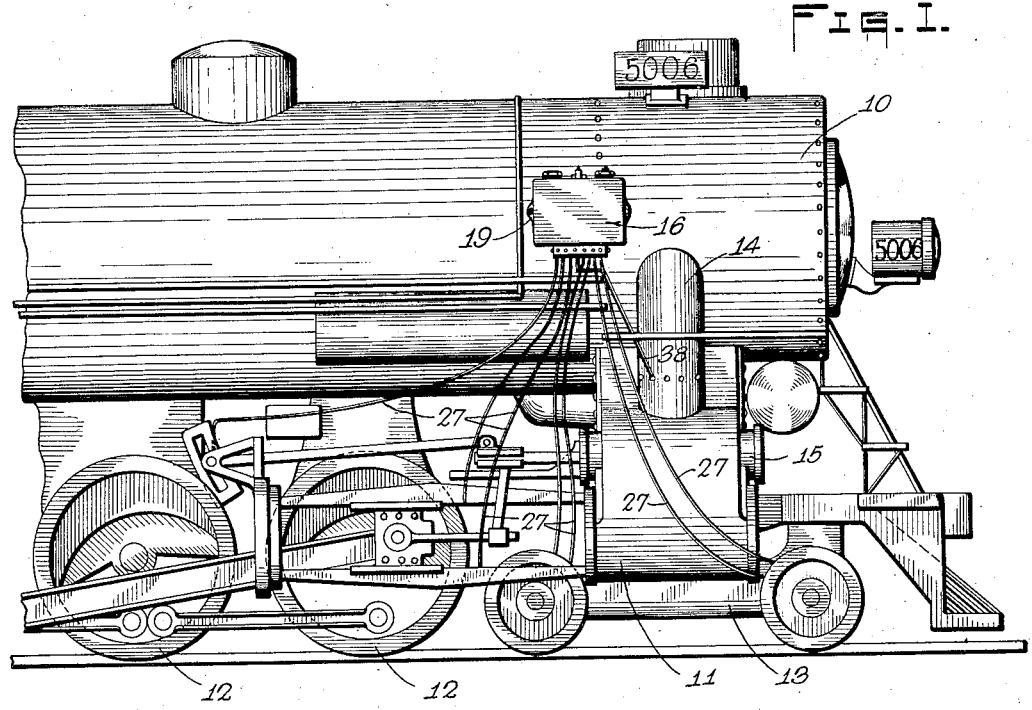
Fig. 1 is a view in side elevation of a portion of a steam locomotive, illustrating a lubricator embodying the invention as having been applied thereto.
Figure 2:
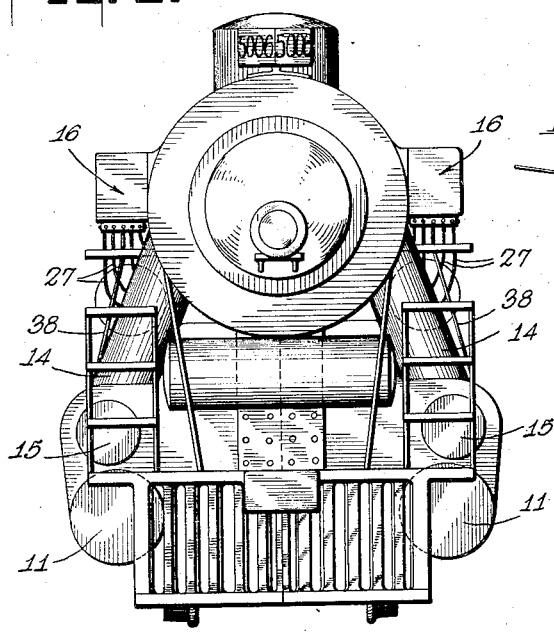
Fig. 2 is a view in front elevation of the same locomotive.

Referring to the accompanying references, wherein similar reference characters designate similar parts throughout, the lubricator is designed to be used upon a steam locomotive having a boiler 10, steam or working cylinders 11, drivers 12, and a pilot truck 13. The steam is supplied through a steam pipe 14 leading from the boiler through a valve mechanism indicated at 15. The above mentioned construction is conventional.

The lubricator forming the present invention consists of a reservoir 16 having front and back sides, ends, a top 17 and a bottom 18. The back side of the lubricator is preferably provided with ears 19 by which it may be mounted, such as against the side of boiler 10 as shown on Fig. 1. This reservoir is preferably, but not necessarily, formed of a single integral casting in the bottom of which there is an outlet 20 which communicates with an annular duct or passage 21. Around the outlet 20 the bottom of the reservoir is slightly raised, as indicated at 20a, so that any sediment tending to collect in the bottom of the reservoir will tend to be confined in the reservoir and will not pass with lubricant through outlet 20. The passage 21 is cored in the bottom of the reservoir in its casting. A plurality of holes 22 are drilled radially into the bottom so as to communicate with duct 21, and these holes 22 are controlled by needle valves 23 which are locked in adjusted positions by means of lock nuts 24. Holes 25 are drilled upwardly into the bottom 18, each hole 25 communicating with a hole 22. The bottoms of holes 25 are enlarged to receive fittings 26 on tubes 27 which may be brass or copper tubing, and which lead to various parts of the locomotive requiring lubrication. For example, one tube 27 may deliver lubricant to the sliding crosshead of the piston rod. Another tube 27 may lead to the bearing brasses and lateral liners on the pilot truck 13. There are as many tubes 27 leading from duct 21 as occasion may require to lubricate various parts of the locomotive.

The bottom 18 of reservoir 16 is cored out at its center as indicated at 28, this cored opening extending through or being located concentrically with respect to annular duct 21. It also extends into the chamber of the reservoir, forming an elevated bottom 29. A tube 30 is also cast integral with the reservoir and joins the elevated bottom 29 with the top 17. Within this tube there is slidably disposed a push rod 31 having a head 32 at its bottom disposed within a recess 33. A hollow cap 34 fits closely within the cored opening 28 and has a flange 35 at its bottom secured to the bottom of the reservoir by cap screws 36. The interior of this cap provides a steam chamber 37 to which steam is admitted through a tube or pipe 38 which is connected to the cap by a fitting 39. The pipe 38 in turn is connected to steam pipe 14 between the boiler 10 and valve mechanism 15. The steam pipe 14 usually has a number of small fittings or sometimes merely plugged holes above the valve mechanism 15, and the lower end of pipe 38 is preferably connected to one of these fittings or a plug is removed and pipe 38 is connected to the hole of the removed plug. It is so arranged that when the throttle of the locomotive is opened by the engineer to deliver steam from the boiler through steam pipe 14 and valve mechanism 15 to cylinder 11, steam is simultaneously supplied through pipe 38 to steam chamber 37. On the top of the cap there is positioned a small gasket 40 over which one or more small metal diaphragms 41 are positioned. In the preferred form of construction the top of cored opening 28 presents a downwardly concaved surface so that when steam is admitted to chamber 37 the diaphragm or diaphragms 41 are pushed upwardly and conform to this concaved surface. At the same time, these diaphragms are effective to lift push rod 31. By having the concaved surface, the metal diaphragm or diaphragms 41 will conform thereto and there is little or no danger of the centers of the diaphragms blowing through because of the steam pressure.

On the top 17 of the reservoir there is pivotally mounted a lever 42, the pivot of which is indicated at 43. This lever is enclosed within a suitable housing 44 which is fastened to pivot post 45 on which pivot 43 is mounted. The opposite end of the lever 42 is pivoted at 46 to a valve 47 extending down through the reservoir in the outlet 20. When steam pressure is admitted to chamber 37 rod 31 is lifted, lifting lever 42 and opening valve 47, permitting lubricant L to flow from the reservoir into duct 21. A coiled spring 48 enclosed within a housing 49 and which may be adjusted, as by a screw 50, urges the valve 47 into closed or seating position. The spring is preferably so adjusted as to urge valve 47 into seating position. However, it is not sufficient to close the valve against the effect of the steam pressure available in chamber 37 when the locomotive is running under "drifting throttle". In other words, when the locomotive is running under "drifting throttle" the intention is to have the pressure sufficient to overcome the force exerted by spring 48 and leave the valve open. As shown on Fig. 3, the top of the reservoir is provided with two caps 51 and 52. These are threaded into the holes used to support the core required to core out the center of the body forming reservoir 16 in casting the body. One of these caps when unscrewed may constitute an inlet and a screening 53 is preferably suspended therefrom to screen the lubricant which is poured into the reservoir. On the other cap there may be attached a stick gauge for measuring the quantity of lubricant in the reservoir.

The operation and advantages of the improved lubricator are as follows:

When the engineer opens the throttle valve to supply steam to cylinder 11 he simultaneously supplies steam to steam chamber 37. This causes an opening of valve 47, permitting lubricant L to flow into duct 21. From this duct the oil simultaneously flows through the various tubes 27 to the various points of lubrication. The rate of flow through each tube 27 is controlled by its respective needle valve 23. It will be noted that in this arrangement the steam chamber 37 is disposed centrally to duct 21 and extends up into reservoir 16. In this way the steam utilized to open valve 47 also is effective to warm or heat the oil in duct 21 just before it flows into the various tubes 27. It also heats the oil supply. In this way, by delivering warmed lubricating oil, the delivery of lubricant to the various bearings even in cold weather is assured.

The steam within the steam chamber 37, of course, has a tendency to condense. With the arrangement as disclosed, the condensate flows back down through pipe 38 and is discharged in the steam pipe 14. When the locomotive has been standing for some time it is customary for the engineer to open his cylinder cocks to blow out any condensate in the cylinders. The condensate which has flowed back from steam chamber 37 into steam pipe 14 finds the same point of egress, so that no special precautions are required to take care of the condensate which forms in steam chamber 38. When the locomotive is no longer pulling, that is, standing still, the supply of steam to steam chamber 37 is cut off, allowing valve 47 to be closed by the action of spring 48. This closing of the valve immediately stops the supply of lubricant to the various bearings because there is no point of ingress for air to duct 21 to enable this duct and the various tubes 27 to drain.

The tubes 27 are relatively small and when the viscosity of the lubricating oil is considered, the lubricating oil in these tubes is too thick to permit entry of air, and, consequently, the further draining of lubricant on to the bearings and various points of lubrication. Because of the fact that duct 21 and the tubes 27 remain filled with lubricant when valve 27 is subsequently opened, there is an immediate supply of lubricant to the various points of lubrication on starting up the locomotive when the various bearings are subjected to the most extreme wear.

Figure 5:
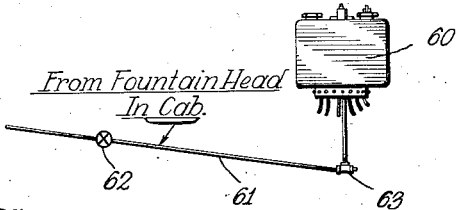
Fig. 5 is a view in elevation illustrating a slight modification.

In Fig. 5 there is illustrated a modified type of construction. The lubricator indicated at 60 is of the same construction as that above described. However, instead of having its pipe 61 leading to its steam chamber corresponding to steam chamber 37 connected to the steam pipe 14 of the locomotive it is connected to a "fountain-head" located in the cab of the locomotive. This pipe 61 is controlled by a manually operable valve 62. Where the construction disclosed in Figs. 1 to 4 is automatic, the construction shown in Fig. 5 may be regarded as hand operated, in that the engineer is intended to open valve 62 to supply steam from the "fountain-head" to the lubricator when he starts up and when approaching a stop to manually shut it off. In this construction the operation and advantages are the same as those above outlined except that the engineer must manually open and close the supply of steam to the steam chamber instead of automatically supplying it and cutting it off on opening and closing the throttle. In this form of construction some provision must be made for bleeding the condensate bodily from the condensed steam. Any suitable mechanism may be employed, such as, for example, a bleed plug or bleeding outlet indicated at 63.

In some instances a single lubricator on one side of boiler 10 may have sufficient pipes 27 connected thereto to supply all bearings on both sides of the locomotive. In other instances, as shown on Fig. 2, one lubricator may be mounted on each side of boiler 10 and each lubricator has tubes 27 leading to the bearings on its respective side of the locomotive only.

From the above described construction it will be appreciated that an improved lubricator is designed wherein the steam not only opens the valve to supply lubricant to the various bearings but it also warms the lubricant. Furthermore, adequate provision is made for taking care of the condensate which condenses in the steam chamber.

Various changes may be made in the details of construction by those skilled in the art without departing from the spirit or scope of the invention as defined in the appended claims.

I claim:

1. A lubricator comprising means providing a reservoir having an outlet, means providing a steam chamber in its bottom, a valve controlling the outlet, means operable by steam pressure in the steam chamber to open the valve, means providing an annular duct surrounding the steam chamber into which the outlet discharges, and a plurality of tubes leading from the duct.

2. A lubricator comprising means providing a lubricant reservoir, means providing a steam chamber, a pipe for delivering steam to the steam chamber connected to the bottom thereof, diaphragm means at the top of the steam chamber, a valve controlling the outlet from the lubricant reservoir, means operable by the diaphragm means for opening the outlet, there being a duct surrounding the steam chamber into which the outlet discharges, and a plurality of tubes leading from said duct.

3. A lubricator comprising means providing a lubricant reservoir, means providing a steam chamber in the bottom of the lubricant reservoir, a pipe for delivering steam to the steam chamber connected to the bottom thereof, diaphragm means at the top of the steam chamber, a push rod operable by the diaphragm means, a lever adapted to be lifted by the push rod, a valve suspended by the lever for opening and closing the outlet from the reservoir, there being a duct surrounding the steam chamber into which the outlet discharges, and a plurality of tubes leading from said duct.

4. A lubricator comprising means providing a lubricant reservoir, means providing a steam chamber, means for supplying the steam chamber with steam, means providing a duct around the steam chamber into which the reservoir discharges so that lubricant discharged into the duct may receive heat from the steam chamber, a valve controlling the discharge from the reservoir into the duct, and means operable by pressure in the steam chamber for operating the valve, there being one or more outlets from the duct.

5. A lubricator comprising means providing a lubricant reservoir having a valve controlled outlet therefrom, means providing a steam chamber arranged in the bottom of the reservoir, a diaphragm at the top of the steam chamber, there being an inlet for steam in the bottom of the steam chamber, a guide extending upwardly from the steam chamber through the lubricant reservoir, a push rod within the guide operable by the diaphragm upon the application of steam pressure in the steam chamber, and means operable by the push rod for opening the valve controlled outlet.

6. A lubricator comprising means providing a lubricant reservoir having a valve controlled outlet therefrom, means providing a steam chamber arranged in the bottom of the reservoir, a diaphragm at the top of the steam chamber, there being an inlet for steam in the bottom of the steam chamber, a guide extending upwardly from the steam chamber through the lubricant reservoir, a push rod within the guide operable by the diaphragm upon the application of steam pressure in the steam chamber, means operable by the push rod for opening the valve controlled outlet, there being a duct surrounding the steam chamber into which the outlet discharges so that lubricant released into the duct may receive heat from the steam chamber and be warmed thereby, and means providing one or more valve controlled outlets from the duct.

ALBERT R. BAILEY.